United States Patent
Xavier et al.

(10) Patent No.: US 10,953,447 B2
(45) Date of Patent: Mar. 23, 2021

(54) SYSTEMS AND METHODS FOR CONTAINING VISCOUS MATERIALS IN ROLL PROCESSING

(71) Applicant: Novelis Inc., Atlanta, GA (US)

(72) Inventors: Renato Rufino Xavier, Kennesaw, GA (US); David Skingley Wright, Rosdorf-Dramfeld (DE); Michael Kosmicki, Spokane, WA (US); Carlos Eboli, Acworth, GA (US); Timothy F. Stanistreet, Kennesaw, GA (US); Young Taeg Park, Yeongju (KR)

(73) Assignee: Novelis Inc., Atlanta, GA (US)

( * ) Notice: Subject to any disclaimer, the term of this patent is extended or adjusted under 35 U.S.C. 154(b) by 0 days.

(21) Appl. No.: 16/440,670

(22) Filed: Jun. 13, 2019

(65) Prior Publication Data
US 2019/0381552 A1     Dec. 19, 2019

Related U.S. Application Data

(60) Provisional application No. 62/684,452, filed on Jun. 13, 2018.

(51) Int. Cl.
*B21D 45/02* (2006.01)
*B21B 45/02* (2006.01)
(Continued)

(52) U.S. Cl.
CPC ........ *B21B 45/0278* (2013.01); *B21B 45/029* (2013.01); *B08B 1/02* (2013.01); *B21B 27/021* (2013.01); *B21B 27/10* (2013.01)

(58) Field of Classification Search
CPC ............ B21B 45/0269; B21B 45/0275; B21B 45/0278; B21B 45/0281; B21B 45/0284;
(Continued)

(56) References Cited

U.S. PATENT DOCUMENTS

| | | | |
|---|---|---|---|
| 3,200,629 A | 8/1965 | James et al. | |
| 4,458,376 A * | 7/1984 | Sitko | B21B 45/0278 118/126 |

(Continued)

FOREIGN PATENT DOCUMENTS

| | | |
|---|---|---|
| CN | 1148820 A | 4/1997 |
| CN | 1633342 A | 6/2005 |

(Continued)

OTHER PUBLICATIONS

Barnwell, Oil Seal Material Chart, (Year: 2018).*

(Continued)

*Primary Examiner* — Adam J Eiseman
*Assistant Examiner* — Bobby Yeonjin Kim
(74) *Attorney, Agent, or Firm* — Kilpatrick Townsend & Stockton LLP

(57) ABSTRACT

Provided herein are systems and methods for containing a viscous material, such as a coolant, on a roll and/or a roll processed engineering material (e.g., a metal strip). In particular, a viscous material containment system can include a movable seal and a gas delivery device. A method for cooling a roll can include applying a viscous material, such as a coolant, to the roll and containing the viscous material on the roll using the viscous material containment system. In some cases, the viscous material containment system can be used to facilitate removal of the viscous material from the roll and/or the roll processed engineering material.

19 Claims, 5 Drawing Sheets

(51) Int. Cl.
*B08B 1/02* (2006.01)
*B21B 27/02* (2006.01)
*B21B 27/10* (2006.01)

(58) Field of Classification Search
CPC .............. B21B 45/029; B21B 45/0293; B21B 45/0296; B21B 45/0218; B21B 45/0233; B21B 27/10; B21B 2027/103; B08B 9/02; B08B 9/021; B08B 9/023; B08B 1/005; B08B 1/02; B08B 5/02; B08B 5/023
USPC ........................................................... 72/236
See application file for complete search history.

(56) References Cited

U.S. PATENT DOCUMENTS

| | | | |
|---|---|---|---|
| 4,601,112 A * | 7/1986 | Kush | B21B 45/0281 34/331 |
| 4,691,549 A | 9/1987 | Adair | |
| 4,718,264 A * | 1/1988 | Guppy | B21B 27/10 72/201 |
| 4,796,450 A | 1/1989 | Blazevic | |
| 4,934,444 A | 6/1990 | Frischknecht et al. | |
| 5,524,465 A * | 6/1996 | Kajiwara | B21B 13/023 72/201 |
| 5,628,223 A * | 5/1997 | Denker | B21B 45/0278 72/236 |
| 6,302,004 B1 | 10/2001 | Taylor | |
| 2009/0255782 A1 | 10/2009 | McBride | |
| 2012/0031159 A1 | 2/2012 | Seidel et al. | |
| 2015/0020564 A1 | 1/2015 | Kipping et al. | |
| 2015/0020845 A1 | 1/2015 | Dagner et al. | |
| 2019/0217355 A1 | 7/2019 | Freliez et al. | |

FOREIGN PATENT DOCUMENTS

| | | |
|---|---|---|
| CN | 101155651 A | 4/2008 |
| CN | 101522930 A | 9/2009 |
| CN | 102665978 A | 9/2012 |
| CN | 204396466 U | 6/2015 |
| DE | 2038873 B | 12/1971 |
| DE | 102009053073 A1 | 9/2010 |
| DE | 102016204501 A1 | 7/2017 |
| EP | 0313516 A1 | 4/1989 |
| EP | 0340026 A2 | 11/1989 |
| EP | 0427359 A2 | 5/1991 |
| EP | 0794023 A3 | 10/1997 |
| EP | 1142652 A2 | 10/2001 |
| FR | 3056419 A1 | 3/2018 |
| JP | S5410931 U | 1/1979 |
| JP | S63224806 A | 9/1988 |
| JP | H0232310 A | 2/1990 |
| JP | H06335714 A | 12/1994 |
| JP | H07239040 A | 9/1995 |
| JP | H07265916 A | 10/1995 |
| JP | 105827 A | 1/1998 |
| JP | 2008185203 A | 8/2008 |
| KR | 100254076 A | 4/2000 |
| RU | 2193936 C1 | 12/2002 |
| RU | 147615 U1 | 11/2014 |
| SU | 749472 | 7/1980 |
| WO | 2005/115651 A1 | 12/2005 |
| WO | 2012/110241 A1 | 8/2012 |
| WO | 2015/086119 A1 | 6/2015 |
| WO | 2015169475 A1 | 11/2015 |
| WO | 2016/083128 A1 | 6/2016 |

OTHER PUBLICATIONS

International Search Report and Written Opinion issued in International Patent Application No. PCT/US2019/037039 dated Sep. 18, 2019, 13 pages.
AU2019287519 , "First Examination Report", dated Feb. 19, 2020, 2 pages.
International Search Report and Written Opinion issued in Application No. PCT/US2019/037041 dated Sep. 23, 2019, 8 pages.
International Search Report and Written Opinion issued in Application No. PCT/US2019/037036 dated Nov. 25, 2019, 11 pages.
Korean Patent Application No. 10-2020-7005555 , "Office Action", dated May 6, 2020, 18 pages.
Russian Patent Application No. 2020106170 , "Office Action", dated Apr. 20, 2020, 22 pages.
Korean Patent Application No. 10-2020-7005555 , Office Action, dated Oct. 8, 2020, 12 pages.
Japanese Patent Application No. 2020-511230 , Office Action, dated Aug. 4, 2020, 17 pages.
Indian Pat. Appl. No. 202017006085, First Examination Report dated Dec. 2, 2020, 5 pages.
Mexican Pat. Appl. No. MX/A/2020/001487, Office Action dated Nov. 24, 2020, 8 pages.
International Pat. Appl. No. PCT/US2019/037039, International Preliminary Report on Patentability dated Dec. 24, 2020, 14 pages.
Chinese Patent Application No. 201980003958.7, Office Action dated Jan. 6, 2021, 19 pages.

* cited by examiner

SYSTEMS AND METHODS FOR CONTAINING VISCOUS MATERIALS IN ROLL PROCESSING

CROSS-REFERENCE TO RELATED APPLICATION

The present application claims priority to and filing benefit of U.S. Provisional Patent Application No. 62/684,452, filed on Jun. 13, 2018, which is incorporated herein by reference in its entirety.

TECHNICAL FIELD

The present disclosure relates to metallurgy generally and more specifically to metal manufacturing.

BACKGROUND

Unless otherwise indicated herein, the materials described in this section are not prior art to the claims in this application and are not admitted to be prior art by inclusion in this section.

Existing roll processing methods can use a wiper to contain a viscous material (e.g., a coolant, a lubricant, a pretreatment, a cleaner, or the like, or any combination thereof) applied to a surface (e.g., a surface of a roll (a work roll, a backup roll, or an intermediate roll) and/or a roll processed engineering material (e.g., a metal article or a polymer film)) during and/or after processing steps performed at elevated temperatures (e.g., hot rolling, cold rolling, and/or warm rolling). In some cases, the wiper is in constant contact with the roll surface, risking collection of debris which can damage the roll and/or the roll processed engineering material surface. Additionally, a vacuum system can be employed to remove viscous materials from, for example, the roll and/or the roll processed engineering material after cooling. Vacuuming uncontained viscous materials can be ineffective at removing viscous materials from the roll and/or roll processed engineering material, particularly when processing is stopped and/or reversed.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Described herein are systems and methods for containing a viscous material (e.g., coolants, cleaners, pretreatments, lubricants, or the like, or any combination thereof) on a surface. The systems and methods can include a seal movable between a first position and a second position, wherein a contacting edge of the seal contacts the surface in the first position and is separated from the surface by a gap in the second position, and a gas delivery system configured to contain the viscous material to a side of the seal when the seal is in the second position and separated from the surface by the gap. The seal can be maintained in the first position by a biasing mechanism that can be gravity, a spring, a tensioner, or an actuator. When the seal is in the first position, the seal can be between an angle that is substantially parallel to the surface and substantially perpendicular to the surface. The gas delivery device can be configured to supply the gas at a velocity sufficient to overcome the biasing mechanism and move the seal into the second position and prevent the viscous material from passing through the gap when the seal is in the second position. In some cases, when the seal is in the first position, the viscous material is capable of flowing onto the seal and into a collection device that can be a channel, a vacuum bar, or a sink. In some aspects, the surface can be a moving surface moving past the seal, though it need not be. In some aspects, the moving surface carries the viscous material toward at least one seal of the plurality of seals. In some non-limiting examples, the surface can be a roll (e.g., a work roll, a backup roll, or an intermediate roll) or a roll processed engineering material (e.g., a metal article such as a metal strip or a polymer film). The seal can be a flexible seal. For example, the flexible seal can be a polymer seal. Polymers for use in the polymer seal include, for example, synthetic rubber (styrene-butadiene), natural rubber, elastomers, cellulose, or the like, or any combinations thereof. In some examples, the seal can be a polysilicon seal, a fabric seal, or a seal made of any suitable material that will not damage the roll processed engineering material and/or the roll when contacting the roll processed engineering material and/or the roll. In some cases, the seal can be a rigid seal. The gas delivery device can be a forced gas delivery device (e.g., an air knife).

Also disclosed herein are systems and methods for containing a viscous material on, and removing a viscous material from, a surface, the system including a movable seal and a gas delivery system configured to move the movable seal within a predetermined distance from the surface and contain the viscous material. The system for containing a viscous material on, and removing a viscous material from, a surface can also include a biasing mechanism (e.g., gravity, a spring, a tensioner, or an actuator) that can maintain the seal in a first position in which the seal contacts the surface. The gas delivery system can be configured to deliver gas toward the seal that is sufficient to overcome the biasing mechanism and move the seal into a second position in which the seal is separated from the surface by a gap. In some non-limiting examples, the seal can be a flexible seal. For example, the flexible seal can be a polymer seal. Polymers for use in the polymer seal include, for example, synthetic rubber (styrene-butadiene), natural rubber, elastomers, cellulose, or the like, or any combinations thereof. In some examples, the seal can be a polysilicon seal, a fabric seal, or a seal made of any suitable material that will not damage the surface when contacting the surface. In some cases, the seal can be a rigid seal. The gas delivery device can be a forced gas delivery device (e.g., an air knife). The system can also include a viscous material collection device (e.g., a channel, a vacuum bar, or a sink) configured to collect the viscous material when the seal is in the first position. The viscous material collection device can be positioned adjacent to a lower edge of the seal (i.e., the lower edge of the seal is opposite the contacting edge of the seal that contacts the surface when the seal is in the first position).

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
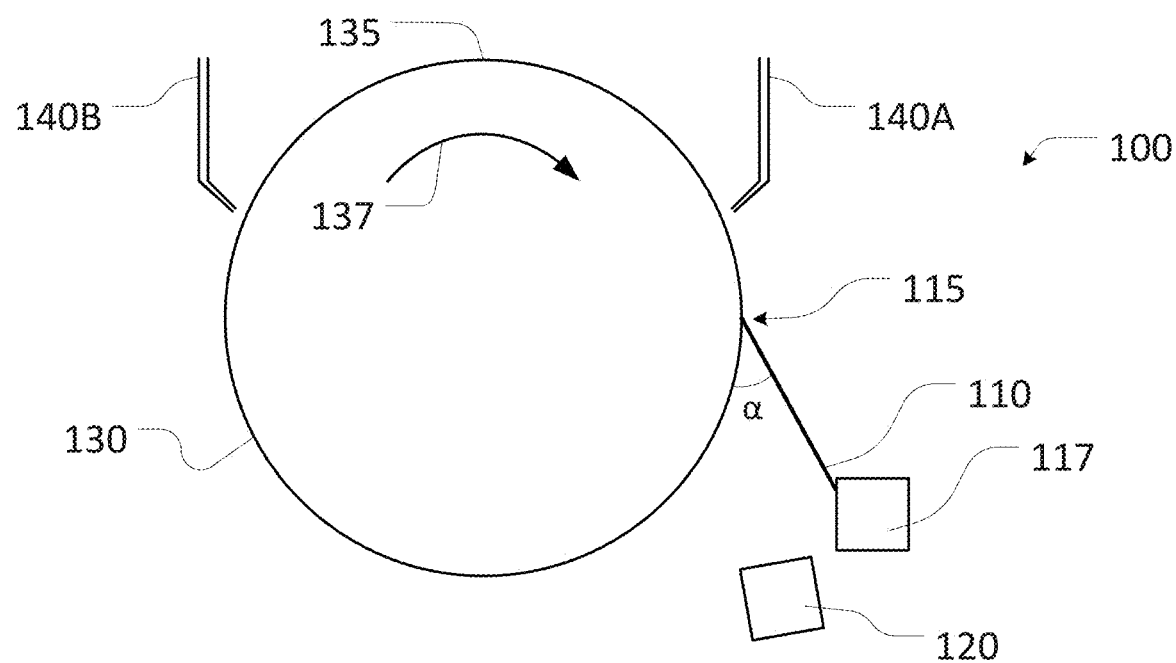
FIG. 1 is a schematic of a viscous material containment system in a first position according to certain aspects of the present disclosure.

Certain aspects and features of the present disclosure relate to roll processing lines for producing roll processed engineering material products such as, but not limited to, a metal article. Further aspects and features of the present disclosure relate to application of a viscous material to a surface, containment of the viscous material on the surface, and/or removal of the viscous material from the surface. Further aspects and features of the present disclosure relate to rolling a roll processed engineering material (e.g., a metal article) in a rolling mill performed in a hot rolling mode, a cold rolling mode, a warm rolling mode, or any combination thereof. Further aspects and features of the present disclosure relate to systems and methods of cooling rolls involved in the hot rolling, cold rolling, or warm rolling and/or, for example, a metal article being rolled or other roll processed engineering material. Still further aspects of the present disclosure relate to systems and methods for containing viscous materials (e.g., coolants, cleaners, pretreatments, lubricants, or the like, or any combination thereof) applied to the rolls and/or the roll processed engineering material (e.g., metal article) without damaging a surface of the rolls and/or the roll processed engineering material.

The terms "invention," "the invention," "this invention" and "the present invention" used herein are intended to refer broadly to all of the subject matter of this patent application and the claims below. Statements containing these terms should be understood not to limit the subject matter described herein or to limit the meaning or scope of the patent claims below.

As used herein, the meaning of "a," "an," or "the" includes singular and plural references unless the context clearly dictates otherwise.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

In some non-limiting examples, a rolling mill can include at least one work stand, and in some examples, the rolling mill can include multiple stands. For example, the rolling mill may include two stands, three stands, four stands, five stands, six stands, or any other number of stands as needed or desired. Each stand can include a pair of work rolls that are vertically aligned. In some cases, each stand includes a pair of backup rolls that support the pair of work rolls. In some examples, each stand also includes a pair of intermediate rolls. During rolling of a metal article, the metal article is passed through a roll gap defined between the work rolls. Rolling the metal article reduces the thickness of the metal article to a desired thickness and imparts particular properties on the metal article depending on the composition of the metal article. Depending on the desired properties or other considerations for the final metal product, the rolling mill may be run in a hot rolling mode, a cold rolling mode, a warm rolling mode, or any combination thereof.

Hot rolling generally occurs at temperatures above a recrystallization temperature of the metal. For example, in some cases where the metal article is aluminum or an aluminum alloy, hot rolling may occur at a temperature greater than about 250° C., such as from about 250° C. to about 550° C. In other examples, various other temperatures for hot rolling may be used.

In contrast to hot rolling, cold rolling generally occurs at temperatures below the recrystallization temperature of the metal. For example, in some cases where the metal article is aluminum or an aluminum alloy, cold rolling may occur at a temperature less than about 200° C., such as from about 20° C. to about 200° C. In other examples, various other temperatures for cold rolling may be used.

In some cases, a metal article may be rolled through a warm rolling process, which occurs at a temperature below the recrystallization temperature of the metal but above the cold rolling temperature. For example, in some cases where the metal article is aluminum or an aluminum alloy, warm rolling may occur at a temperature from about 200° C. to about 250° C. In other examples, various other temperatures for warm rolling may be used.

In some examples, the rolling mill includes a metal article cooling system that is configured to apply a coolant to the outer surface of the metal article to control a temperature of the metal article. In some non-limiting examples, the coolant is water, oil, gel, or any suitable heat transfer medium. In some cases, the coolant is an organic heat transfer medium, a silicone fluid heat transfer medium, or a glycol-based heat transfer medium (e.g., ethylene glycol, propylene glycol, any other polyalkylene glycol, or any combination thereof), or the like. In some cases, the cooling system includes a roll cooling header and a coolant containment system.

Although portions of this description describe the use of liquid coolants, the systems and methods described herein can be used for any viscous materials, including coolants, cleaners, treatments, pretreatments, aesthetic coatings, lubricants (e.g., gels, sol-gels, and certain glasses), etc., or any combination thereof.

In some examples, a viscous material containment system is configured to contain the viscous material (e.g., coolant) to a desired area on a work roll, and for removing the viscous material or drying the work roll. In various examples, depending on the configuration of a rolling mill, any number of viscous material application headers and viscous material containment systems may be utilized. For example, a work roll cooling system and/or a work roll lubrication system may be provided at various locations within the rolling mill such as at an upper work roll, at a lower work roll, at an upper backup roll, at a lower backup roll, combinations thereof, or any suitable location where cooling is desired.

In some cases, the rolling mill includes one or more systems that can simultaneously apply various viscous materials to, for example, a work roll and a roll processed engineering material (e.g., a metal article). In some non-limiting examples, a roll cooling system and a roll processed engineering material lubricating system can be simultaneously employed. In such instances, a liquid coolant applied by the roll cooling system and a liquid lubricant applied by the roll processed engineering material lubricating system should not cross-contaminate, further requiring sequestration of the liquid coolant from the liquid lubricant. In some non-limiting examples, the roll cooling system can contain the liquid coolant to the roll and the roll processed engineering material lubricating system can contain the liquid lubricant to the roll processed engineering material, thus sequestering the liquid coolant from the liquid lubricant.

In some cases, the roll can be stainless steel, steel, or made of any suitable material. In some non-limiting examples, the roll processed engineering material can be a metal article including aluminum, aluminum alloys, magnesium, magnesium-based materials, titanium, titanium-based materials, copper, copper-based materials, steel, steel-based materials, bronze, bronze-based materials, brass, brass-based materials, composites, sheets used in composites, or any other suitable metal or combination of materials. The metal article may include monolithic materials, as well as non-monolithic materials such as roll-bonded materials, clad materials, composite materials (such as but not limited to carbon fiber-containing materials), or various other materials, or the like. In some examples, the metal article is a metal coil, a metal strip, a metal plate, a metal sheet, a metal billet, a metal ingot, or the like. In some cases, the systems and methods described herein can be used with a non-metal roll processed engineering material (e.g., a polymer film). The viscous material containment system can be a compact viscous material containment system when compared to conventional roll viscous material containment systems, thus enabling implementation at any desired point in a rolling mill, including retrofitting existing rolling mills with the disclosed viscous material containment system.

In some examples, the seal of the disclosed viscous material containment system can be a flexible seal or a rigid seal. For example, the flexible seal can be a polymer seal. Polymers for use in the polymer seal include, for example, synthetic rubber (styrene-butadiene), natural rubber, elastomers, cellulose, or the like, or any combinations thereof. In some examples, the seal can be a polysilicon seal, a fabric seal, or a seal made of any suitable material that will not damage the roll and/or the roll processed engineering material when contacting the roll and/or the roll processed engineering material. In some cases, the seal can be a rigid seal made of any suitable material that will not damage the roll and/or the roll processed engineering material when contacting the work roll and/or the roll processed engineering material.

In some cases, a system can be employed to move the movable seal from a first position to a second position, and optionally maintain the movable seal in the second position. The system to move the seal from the first position to the second position and optionally maintain the seal in the second position (e.g., a predetermined distance from the surface creating the gap) can include an actuator, a motor, a cam, a gas delivery system, any suitable positioning means, or any combination thereof. In some non-limiting examples, the gas delivery system is a forced gas delivery system. In some cases, the forced gas delivery system is an air knife.

In some examples, the rolling mill includes a roll processed engineering material cooling system (e.g., a metal article cooling system) that is configured to apply a coolant to the outer surface of a metal article to control a temperature of the metal article. In some non-limiting examples, the coolant is water, oil, gel, or any suitable heat transfer medium. In some cases, the coolant is an organic heat transfer medium, a silicone fluid heat transfer medium, or a glycol-based heat transfer medium (e.g., ethylene glycol, propylene glycol, any other polyalkylene glycol, or any combination thereof), or the like. In some examples, the metal article cooling system is configured to reduce a temperature of the metal article during processing. In various examples, the metal article cooling system includes a metal article cooling header that is configured to apply a coolant on at least one surface of the metal article to control the temperature of the metal article. In some examples, the metal article cooling system also includes a viscous material removal system for removing coolant or other viscous material (e.g., pretreatment, cleaner, lubricant, etc.) from a desired area on the metal article (i.e., drying the metal article), and/or for containing the coolant or other viscous material to a desired area on the metal article. In various examples, depending on the configuration of the rolling mill, any number of roll cooling headers and viscous material removal systems may be utilized. The metal article cooling system may be provided at various locations within the rolling mill such as below the metal article, above the metal article, beside the metal article in a vertical rolling mill, combinations thereof, or any suitable location where cooling is desired and the coolant or other viscous material is to be removed before the metal article enters a subsequent work stand or other processing equipment. In some non-limiting examples, the metal article can be metal coil, a metal strip, a metal plate, a metal sheet, a metal foil, a metal billet, a metal ingot, or the like.

In some further examples, the rolling mill includes a cleaning system that is configured to apply a cleaner to the outer surface of the roll processed engineering material (e.g., a metal article) to remove contaminants that can collect on the metal article. In some examples, the cleaning system is configured to apply solvents, detergents, surfactants, acids, bases, any other suitable surface cleaning agent, or any combination thereof, onto at least a first surface of the metal article during processing. In various examples, the metal article cleaning system includes a metal article cleaning header that is configured to apply the cleaner on at least one surface of the metal article to remove oils and/or debris from the surface of the metal article. In some examples, the metal article cleaning system also includes a cleaner and/or a contaminant removal system for removing the cleaner and/or contaminants from a desired area on the metal article (i.e., drying and/or wiping the metal article), and/or for containing the cleaner and/or contaminants to a desired area on the metal article. In various examples, depending on the configuration of the rolling mill, any number of roll cleaning headers and cleaner and/or contaminant removal systems may be utilized. The metal article cleaning system may be provided at various locations within the rolling mill such as below the metal article, above the metal article, beside the metal article in a vertical rolling mill, combinations thereof, or any suitable location where cleaning is desired and the cleaner and/or contaminants are to be removed before the metal article enters a subsequent work stand or other processing equipment.

Likewise, in some further examples, the rolling mill includes a pretreating system that is configured to apply a pretreatment to the outer surface of the roll processed engineering material (e.g., a metal article) to prepare the outer surface of the metal article for certain downstream processing. In some examples, the pretreating system is configured to apply adhesion promoters, corrosion inhibitors, aesthetic films, or any other suitable surface pretreatment agent onto at least a first surface of the metal article during processing. In various examples, the metal article pretreating system includes a metal article pretreating header that is configured to apply the pretreatment on at least one surface of the metal article. In some examples, the metal article pretreating system also includes a removal system for removing any excess pretreatment from a desired area on the metal article (i.e., drying the metal article), and/or for containing the pretreatment to a desired area on the metal article. In various examples, depending on the configuration of the rolling mill, any number of roll pretreating headers and excess pretreatment removal systems may be utilized. The metal article pretreating system may be provided at various locations within the rolling mill such as below the metal article, above the metal article, beside the metal article in a vertical rolling mill, combinations thereof, or any suitable location where pretreating is desired and the excess pretreatment is to be removed before the metal article enters a subsequent work stand or other processing equipment.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic of a viscous material containment system 100 in a first position as described herein. The viscous material containment system 100 can be employed to cool one or more rolls and/or a roll processed engineering material (e.g., a metal article) and can be configured to contain any viscous material applied to the one or more rolls and/or the roll processed engineering material. For example, the viscous material containment system 100 can be configured to prevent or minimize viscous material applied to one or more rolls from contacting the roll processed engineering material (e.g., a metal article) passing through the roll. As shown in FIG. 1, the viscous material containment system 100 includes a seal 110 and a gas delivery device 120. The seal 110 can be flexible or rigid and formed of any suitable material. For example, the flexible seal can be a polymer seal. Polymers for use in the polymer seal include, for example, synthetic rubber (styrene-butadiene), natural rubber, elastomers, cellulose, or the like, or any combinations thereof. In some examples, the seal can be a polysilicon seal, a fabric seal, or a seal made of any suitable material that will not damage the roll processed engineering material and/or the roll when contacting the roll processed engineering material and/or the roll.

When in the first position, the seal 110 contacts a roll 130 at an angle α. The roll 130 can be a work roll, a backup roll, or an intermediate roll. In some aspects, α can be an angle such that the seal 110 is substantially tangent to the roll 130. In some examples, α can be an angle such that the seal 110 is substantially perpendicular to the roll 130. In some non-limiting examples, α can be any angle such that the seal 110 is anywhere between substantially tangent to the roll 130 and substantially perpendicular to the roll 130. For example, α can be an angle between the roll 130 and the seal 110 of about 1°, 2°, 3°, 4°, 5°, 6°, 7°, 8°, 9°, 10°, 15°, 20°, 25°, 30°, 35°, 40°, 45°, 50°, 55°, 60°, 65°, 70°, 75°, 80°, 85°, 90°, or anywhere in between.

In some examples, in the first position, the seal 110 contacts the roll 130 such that a contacting longitudinal edge 115 of the seal 110 is substantially parallel to a longitudinal axis L of the roll 130 (as in the example of FIG. 4), though it need not be. The seal 110 can be biased into contact with the roll 130 by a spring-loaded device, an actuator, a tensioner, or any suitable moveable biasing mechanism 117. The biasing mechanism 117 is configured to apply pressure to the seal 110 to urge the seal 110 into contact with the roll 130. Applying pressure from the biasing mechanism 117 can be manually controlled (e.g., using thumb screws), computer controlled (e.g., using servo driven actuators), or uncontrolled (e.g., the pressure can be applied but not adjusted).

As in an example of a roll cooling system shown in FIG. 1, one or more roll viscous material application headers 140A is disposed adjacent to the viscous material containment system 100. The roll viscous material application header 140A is configured to apply viscous materials to the surface of the roll 130. The roll viscous material application header 140A can be disposed on a same side of the roll 130 as the viscous material containment system 100. The roll viscous material application header 140A can be disposed at a position relative to the viscous material containment system 100 such that any viscous material applied to the roll 130 by the roll viscous material application header 140A can be drawn downward over the roll 130 by gravity toward the viscous material containment system 100. For example, the seal 110 can be disposed adjacent to the roll 130 such that a majority of the roll 130 (i.e., greater than about 50% of a cross sectional area of the roll 130) is positioned above the contacting longitudinal edge 115 of the seal 110. The roll viscous material application header 140A can be disposed adjacent to an apex 135 of the roll 130 such that any viscous material delivered to the roll 130 by the roll viscous material application header 140A can be drawn down the surface of the roll toward the viscous material containment system 100 by gravity (i.e., the viscous material is gravity drawn).

In some cases, the roll 130 can be rotated in a direction 137 such that the surface of the roll 130 moves in a direction corresponding to the direction of the gravity drawn viscous material, further moving the viscous material toward the viscous material containment system 100 (i.e., the surface of the roll 130 rotates in a direction such that the viscous material is directed toward the viscous material containment system 100 and toward the seal 110). Delivering the viscous material from the roll viscous material application header 140A can be performed manually or by a computer driven delivery device.

In some cases, an additional roll viscous material application header 140B can be disposed on an opposite side of the roll 130 from the viscous material containment system 100. The roll viscous material application header 140B can be disposed adjacent to an apex 135 of the roll 130 on the side opposite the viscous material containment system 100 such that any viscous material delivered to the roll 130 by the roll viscous material application header 140B can be drawn up the surface of the roll 130 by the rotation of the roll (e.g., in direction 137), across the apex 135, and down the surface of the roll 130 toward the viscous material containment system 100 by the rotation of the roll 130 and/or by gravity. In some examples, the roll 130 rotates opposite the direction 137 and the viscous material containment system 100 can be positioned on the opposite side of the roll 130 to that illustrated in FIG. 1 (i.e., the viscous material containment system 100 can be positioned on either side of the roll 130 such that the rotational direction of the roll carries the viscous material toward the viscous material containment system 100 and toward the seal 110).

Figure 2:
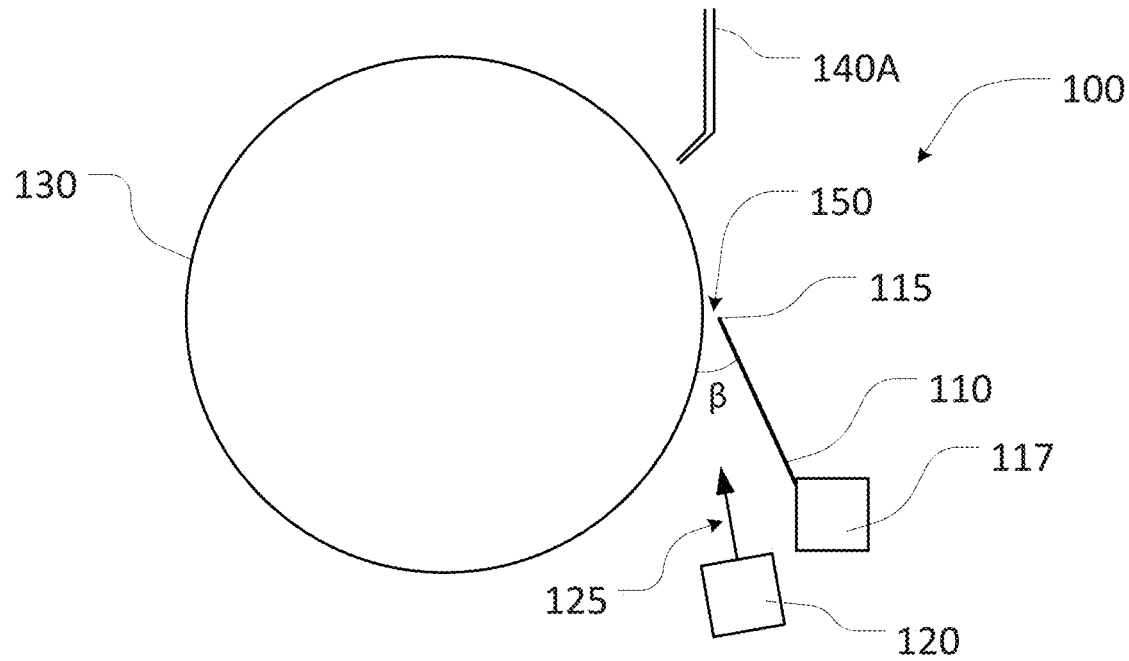
FIG. 2 is a schematic of a viscous material containment system in a second position according to certain aspects of the present disclosure.

FIG. 2 is a schematic of the viscous material containment system 100 in a second position where the seal 110 does not contact the roll 130. In particular, the contacting longitudinal edge 115 of the seal 110 is separated from the roll 130 by a gap 150. The viscous material containment system 100 includes a gas delivery device 120, which may be an air knife or other forced gas delivery device. A gas flow 125 from the gas delivery device 120 can be employed to move the seal 110 from the first position into the second position creating the gap 150 between the seal 110 and the roll 130. The gap 150 can have any suitable dimensions, such as a width of from about 0.1 millimeters (mm) to about 3.0 mm. For example, the gap can be about 0.1 mm, about 0.15 mm, about 0.2 mm, 0.25 mm, about 0.3 mm, about 0.35 mm, about 0.4 mm, about 0.45 mm, about 0.5 mm, about 0.55 mm, about 0.6 mm, about 0.65 mm, about 0.7 mm, about 0.75 mm, about 0.8 mm, about 0.85 mm, about 0.9 mm, about 0.95 mm, about 1.0 mm, about 1.1 mm, about 1.2, mm, about 1.3 mm, about 1.4 mm, about 1.5 mm, about 1.6 mm, about 1.7 mm, about 1.8 mm, about 1.9 mm, about 2.0 mm, about 2.1 mm, about 2.2, mm, about 2.3 mm, about 2.4 mm, about 2.5 mm, about 2.6 mm, about 2.7 mm, about 2.8 mm, about 2.9 mm, about 3.0 mm, or anywhere in between.

The gas flow 125 is aimed in a direction such that the gas is concentrated at the location where the seal 110 contacts the roll 130 with the contacting longitudinal edge 115. Force applied by delivering the gas flow 125 can move the seal 110 into the second position, thereby creating a new angle β and the gap 150 between the seal 110 and the roll 130. The gas flow 125 can propagate through the gap 150 at any suitable velocity. The velocity can be determined by a rate of the gas flow 125 and a size of the gap 150. The size of the gap 150 can be determined by pressure applied by the biasing mechanism 117. The pressure applied by the biasing mechanism 117 can be any pressure such that the seal 110 does not damage the roll 130 when the seal 110 is in the first position (see FIG. 1), or when the gas flow 125 is deactivated and the seal 110 moves from the second position to the first position. The velocity of the gas flow 125 can be sufficient to maintain the viscous material at a position adjacent the surface of the roll 130 such that the viscous material cannot enter the gap 150 and/or move through the gap 150 past the contacting longitudinal edge 115 of the seal (i.e., so the viscous material cannot move through the gap 150 onto the roll processed engineering material, such as a metal article, passing the roll 130).

Figure 3:
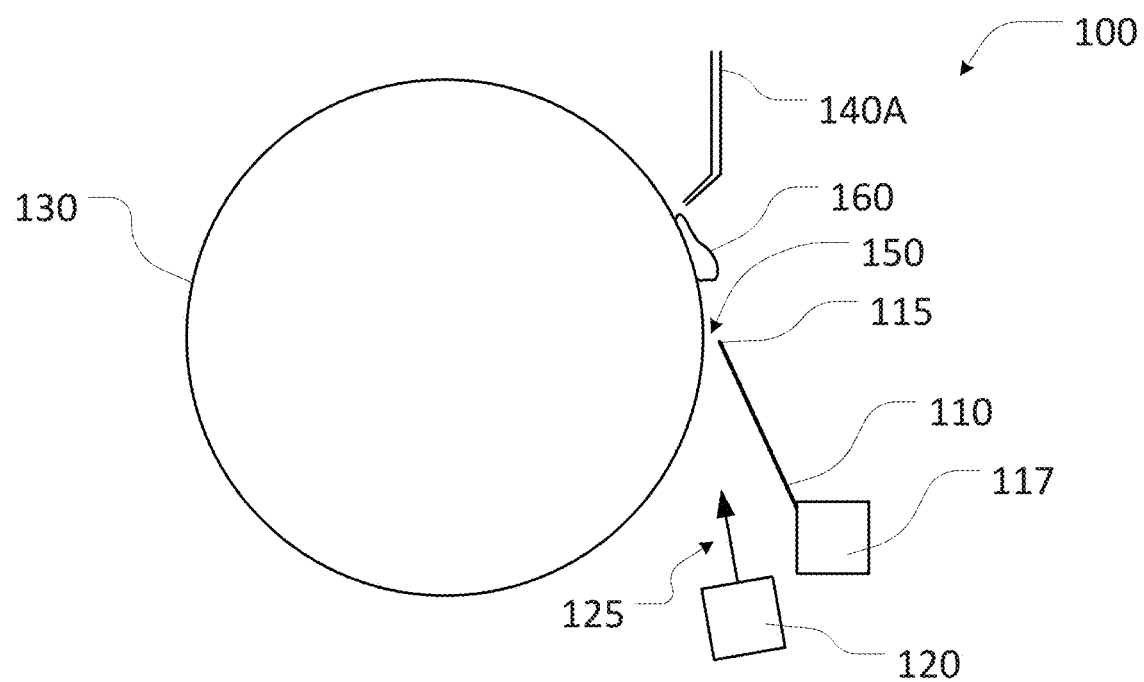
FIG. 3 is a schematic of a viscous material containment system containing a viscous material according to certain aspects of the present disclosure.

FIG. 3 is a schematic depicting viscous material containment using the viscous material containment system 100. The viscous material 160 can be effectively contained by the gas flow 125 creating the gap 150 and moving through the gap 150 at the desired velocity. Using the gas flow to move the seal 110 into the second position away from the roll 130 provides a noncontact seal sufficient to contain the viscous material 160 to a desired position/area. In some aspects, containing the viscous material 160 to the desired position/area includes containing the viscous material 160 to a side of the seal 110 that is opposite the gas flow 125 and the gas delivery device 120. In some examples, the gas flow 125 can be augmented with a liquid flow. For example, a water mist can be mixed with the gas flow 125 to enhance containment of a hydrophobic viscous material.

Figure 4:
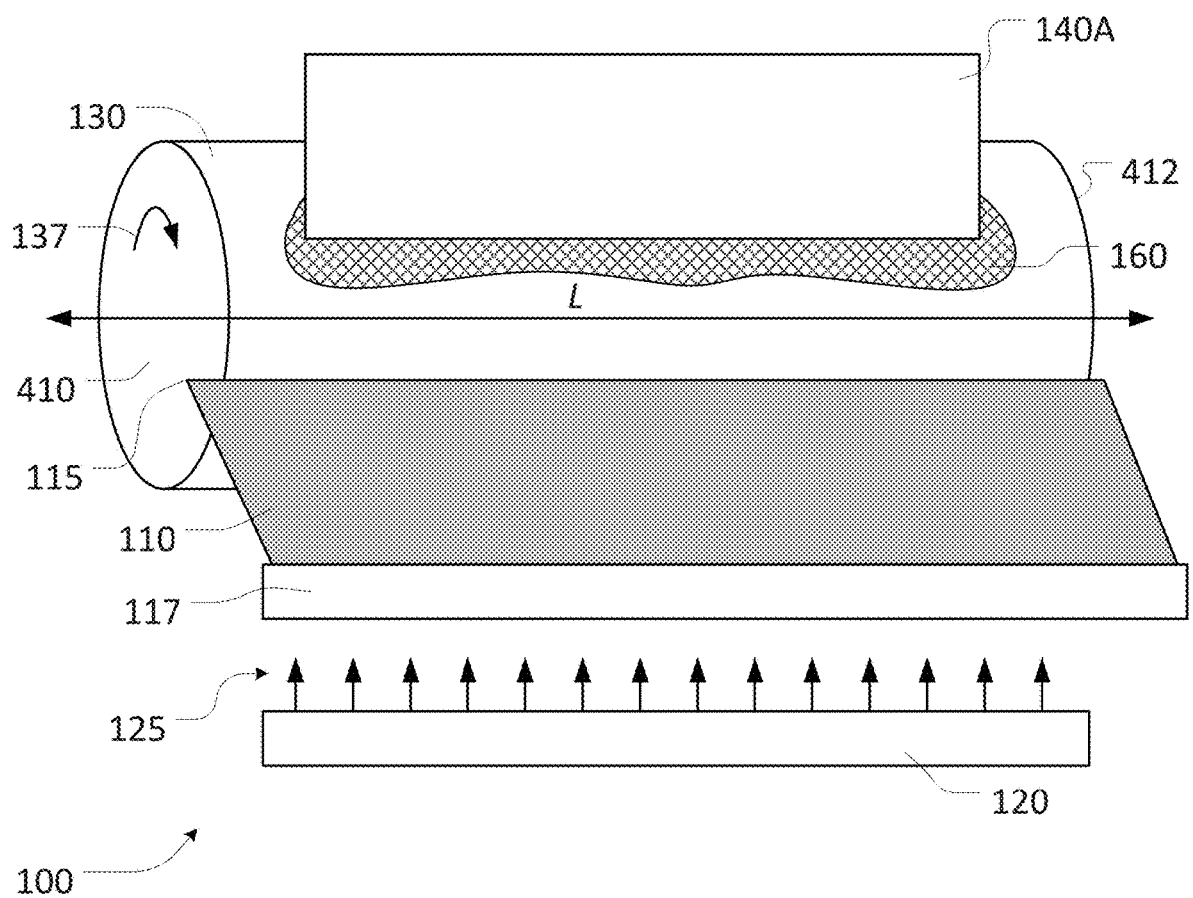
FIG. 4 is a front perspective view of a viscous material containment system according to certain aspects of the present disclosure.

FIG. 4 is a front perspective view of the viscous material containment system 100. The seal 110 can have any suitable longitudinal length L; in some cases, as shown in FIG. 4, the seal 110 extends beyond a first end 410 of the roll 130 and beyond a second end 412 of the roll 130 (i.e., the seal 110 can be longer than the roll 130, though it need not be). In some examples, the seal 110 has a longitudinal length that can be equal to the longitudinal length of the roll 130. In some cases, the seal 110 can have a longitudinal length that is less than a longitudinal length of the roll 130, as in the example of FIG. 5 (i.e., the seal 110 can be shorter than the roll 130).

In some non-limiting examples, when the gas delivery device 120 is deactivated, the seal 110 can return to the first position, where the seal contacts the roll 130 at the contacting longitudinal edge 115. Contacting the seal 110 to the roll 130 can help provide removal of any viscous material 160 on the roll 130. For example, in some cases, the viscous material 160 can flow over the contacting longitudinal edge 115 and the seal 110 can guide the viscous material 160 into a channel, a collector tray, a vacuum retrieval system (e.g., a vacuum bar), a sink, or any suitable viscous material collection device. The viscous material 160 can then be recycled and/or recirculated if desired.

Figure 5:
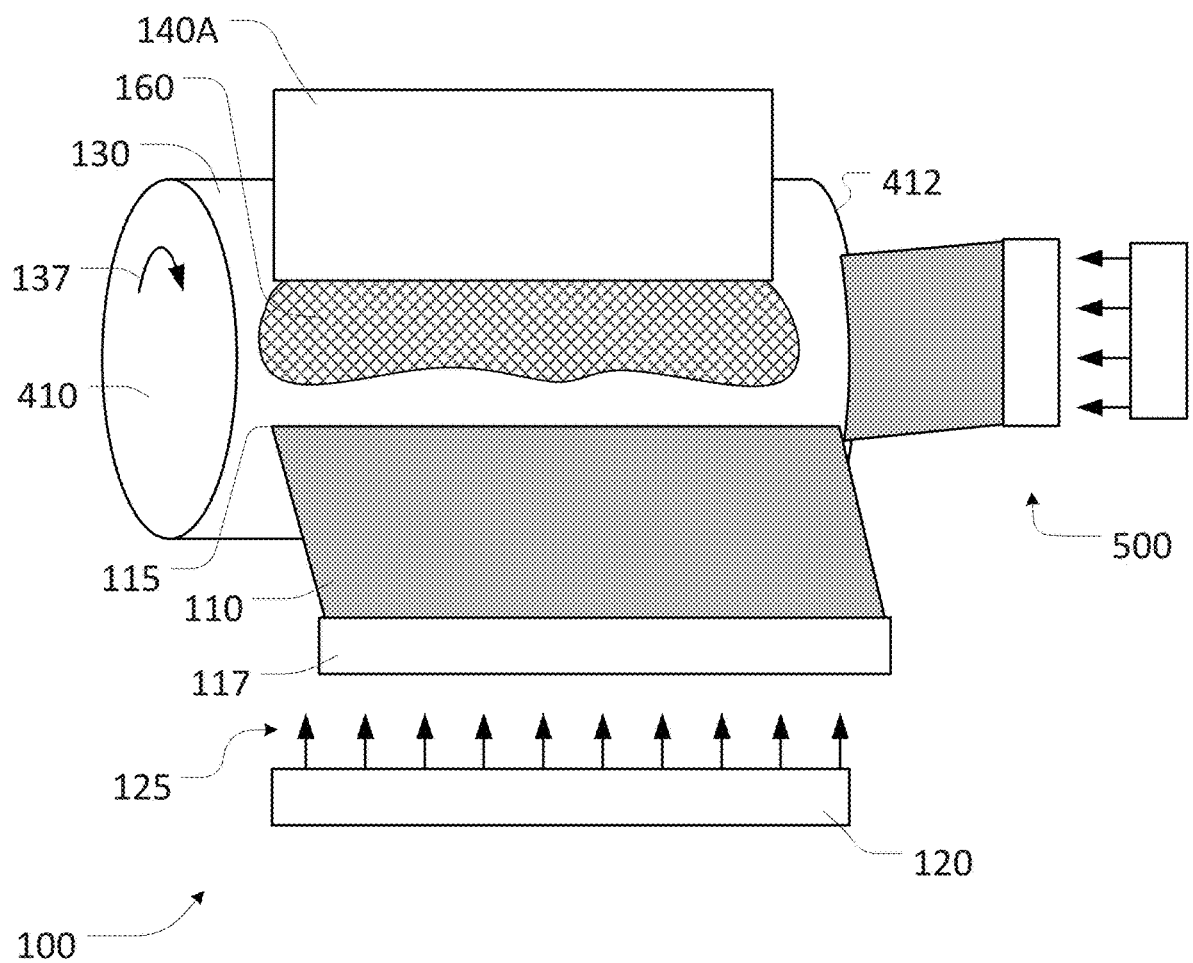
FIG. 5 is a front perspective view of a viscous material containment system according to certain aspects of the present disclosure.

As shown in FIG. 5, in some examples, one or more of an end viscous material containment system 500 can be disposed at the first end 410 of the roll 130, the second end 412 of the roll 130, or both ends 410, 412 of the roll 130. In some examples, end viscous material containment system 500 disposed along one or both ends 410, 412 of the roll 130 can be oriented substantially perpendicular to the viscous material containment system 100 disposed along the longitudinal axis L of the roll 130. Employing end viscous material containment system 500 in this manner can provide further containment of the viscous material 160, thereby preventing the viscous material 160 from approaching either the first end 410 of the roll 130, the second end 412 of the roll 130, or both ends 410, 412 of the roll 130.

Figure 6:
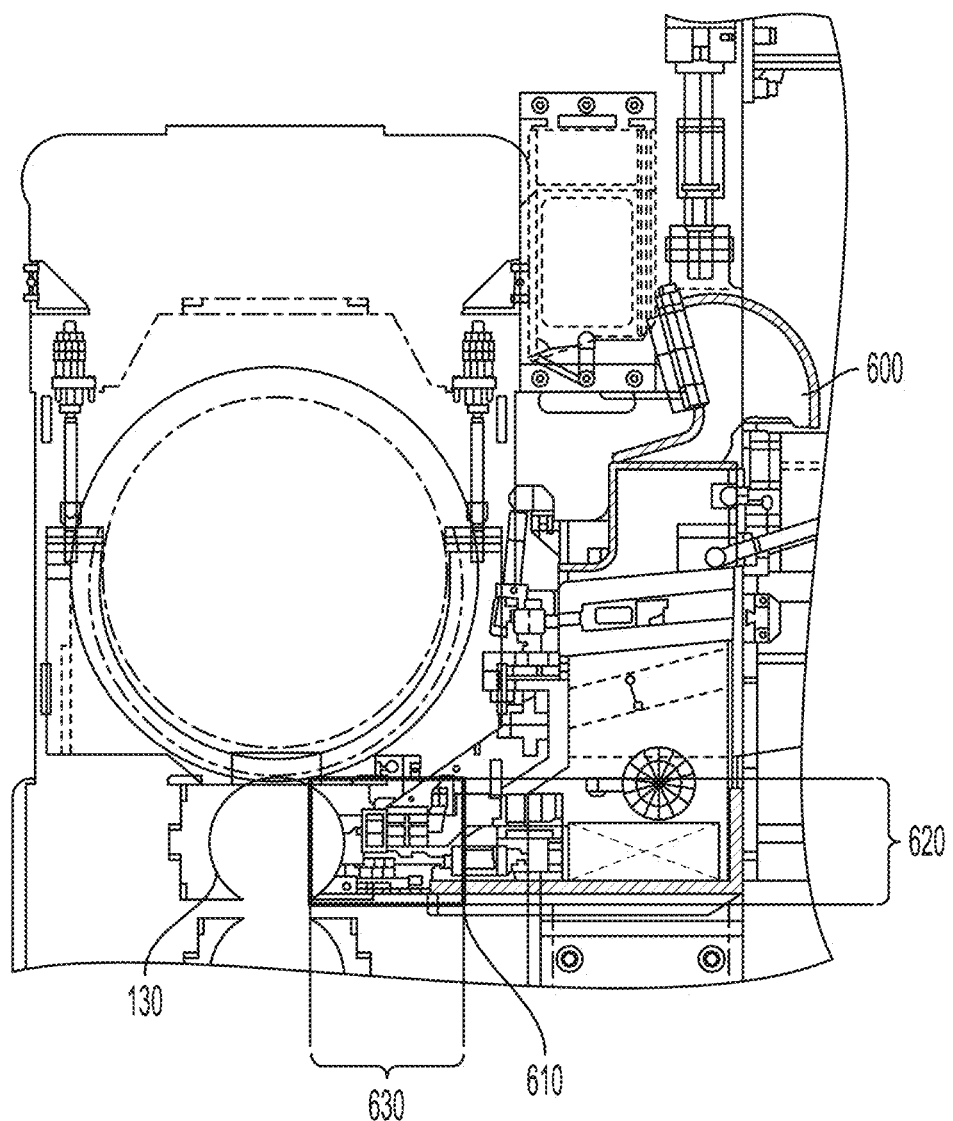
FIG. 6 is a schematic showing a comparative roll cooling system and size of an exemplary viscous material containment system according to certain aspects of the present disclosure.

The viscous material containment system 100 can be a compact system when compared to existing cooling and coolant containment systems. FIG. 6 shows a schematic of a cooling system 600 used in rolling mills to cool work rolls. The viscous material containment system 100 as described herein can occupy a significantly reduced space 610. The significantly reduced space 610 can have dimensions 620 and 630 which are significantly smaller than dimension of the cooling system 600. In some examples, the viscous material containment system 100 occupying the significantly reduced space 610 can be placed at any desired location in a processing line. In some examples, the viscous material 160 can be supplied by a general viscous material supply system, wherein a compact system as described herein is supplied with viscous material 160 via feed lines and does not require a storage tank, thus maintaining the compactness of the viscous material containment system 100. In some aspects, supplying viscous material 160 via feed lines allows the viscous material containment system 100 to be adapted for applications including roll lubricating, roll cleaning, roll processed engineering material cooling, roll processed engineering material lubricating, roll processed engineering material cleaning, roll processed engineering material pretreating, or any suitable process requiring application, containment, and removal of a viscous material. Because of its reduced size, the viscous material containment system 100 can be retrofitted with rolling mills that would not otherwise have enough space to accommodate a traditional cooling and containment system.

In some non-limiting examples, the viscous material containment system 100 and/or the end viscous material containment system 500 can be positioned at any desired position adjacent to the roll 130 such that the gas flow 125 can contain the viscous material 160 being drawn across the surface of the roll 130 by gravity or the rotational direction 137. In some examples, the viscous material containment system 100 and/or the end viscous material containment system 500 can be positioned adjacent to any roll in a rolling mill. In some aspects, the viscous material containment system 100 and/or the end viscous material containment system 500 can be positioned adjacent to any roll requiring application, containment, and removal of a viscous material. The viscous material containment system 100 and/or the end viscous material containment system 500 can be placed adjacent to an upper work roll, a lower work roll, an upper backup roll, a lower backup roll, a first work roll in a vertical rolling mill, a second work roll in a vertical rolling mill, a first backup roll in a vertical rolling mill, a second backup roll in a vertical rolling mill, or any roll requiring application, containment, and removal of a viscous material.

Example 1 is a system for containing a viscous material applied to a surface, comprising a seal movable between a first position and a second position, wherein a contacting edge of the seal contacts the surface in the first position and is separated from the surface by a gap in the second position, and a gas delivery system configured to contain the viscous material to a side of the seal when the seal is in the second position and separated from the surface by the gap.

Example 2 is the system of any preceding or subsequent example, wherein the surface is a moving surface.

Example 3 is the system of any preceding or subsequent example, wherein the moving surface carries the viscous material toward the seal.

Example 4 is the system of any preceding or subsequent example, wherein the viscous material comprises a liquid, a gel, a sol-gel, a glass, or any combination thereof.

Example 5 is the system of any preceding or subsequent example, wherein the moving surface comprises a roll or a roll processed engineering material.

Example 6 is the system of any preceding or subsequent example, wherein the viscous material further comprises a cleaner, a lubricant, a treatment, a pretreatment, an aesthetic coating, a coolant, or any combination thereof.

Example 7 is the system of any preceding or subsequent example, wherein the roll comprises a work roll, a backup roll, or an intermediate roll.

Example 8 is the system of any preceding or subsequent example, wherein the roll processed engineering material comprises a metal article, a polymer, a composite, or any combination thereof.

Example 9 is the system of any preceding or subsequent example, further comprising a biasing mechanism.

Example 10 is the system of any preceding or subsequent example, wherein the biasing mechanism maintains the seal in the first position in which the seal contacts the surface.

Example 11 is the system of any preceding or subsequent example, wherein the gas delivery system is configured to deliver gas toward the seal that is sufficient to overcome the biasing mechanism and move the seal into the second position in which the seal is separated from the surface by the gap.

Example 12 is the system of any preceding or subsequent example, wherein the biasing mechanism is gravity, a spring, a tensioner, or an actuator.

Example 13 is the system of any preceding or subsequent example, wherein the seal is a flexible seal.

Example 14 is the system of any preceding or subsequent example, wherein the flexible seal comprises a polymer seal, a polysilicon seal, or a fabric seal.

Example 15 is the system of any preceding or subsequent example, wherein the seal is rigid.

Example 16 is the system of any preceding or subsequent example, wherein the gas delivery system is a forced gas delivery system.

Example 17 is the system of any preceding or subsequent example, wherein the forced gas delivery system is an air knife.

Example 18 is the system of any preceding or subsequent example, further comprising a viscous material collection device configured to collect the viscous material when the seal is in the first position.

Example 19 is the system of any preceding or subsequent example, wherein the viscous material collection device is positioned adjacent to a lower edge of the seal.

Example 20 is the system of any preceding or subsequent example, wherein the lower edge of the seal is opposite the contacting edge of the seal, wherein the contacting edge of the seal contacts the surface when the seal is in the first position.

Example 21 is a method of containing a viscous material on a surface, comprising: moving a seal into a first position where a contacting edge of the seal contacts the surface; and delivering a gas from a gas delivery system toward the contacting edge of the seal to move the seal into a second position where the contacting edge of the seal is separated from the surface by a gap, wherein a velocity of the gas is sufficient to prevent the viscous material on the surface from passing through the gap.

Example 22 is the method of any preceding or subsequent example, further comprising containing the viscous material on a moving surface.

Example 23 is the method of any preceding or subsequent example, wherein containing the viscous material on the moving surface comprises the moving surface carrying the viscous material toward the seal.

Example 24 is the method of any preceding or subsequent example, further comprising containing the viscous material on a roll or on a roll processed engineering material.

Example 25 is the method of any preceding or subsequent example, wherein moving the seal into the first position to contact the surface comprises moving a flexible seal into the first position to contact the surface.

Example 26 is the method of any preceding or subsequent example, wherein moving the flexible seal comprises moving a polymer seal, a polysilicon seal, or a fabric seal.

Example 27 is the method of any preceding or subsequent example, wherein moving the seal into the first position where the contacting edge of the seal contacts the surface comprises moving a rigid seal into the first position to contact the surface.

Example 28 is the method of any preceding or subsequent example, wherein moving the seal into the first position where the contacting edge of the seal contacts the surface further comprises positioning the seal such that the seal is at an angle that is between substantially parallel to the surface and substantially perpendicular to the surface.

Example 29 is the method of any preceding or subsequent example, wherein moving the seal into the first position where the contacting edge of the seal contacts the surface further comprises biasing the seal with a biasing mechanism.

Example 30 is the method of any preceding or subsequent example, wherein biasing the seal is performed with gravity, a spring, a tensioner, or an actuator.

Example 31 is the method of any preceding or subsequent example, wherein delivering the gas is performed by a forced gas delivery system.

Example 32 is the method of any preceding or subsequent example, wherein delivering the gas is performed by an air knife.

Example 33 is the method of any preceding or subsequent example, wherein delivering the gas overcomes a biasing mechanism to allow the seal to move into the second position.

Example 34 is the method of any preceding or subsequent example, further comprising removing the viscous material from the surface.

Example 35 is the method of any preceding or subsequent example, wherein delivering the gas to prevent the viscous material from passing through the gap allows the viscous material to flow onto the seal and into a collection device.

Example 36 is the method of any preceding or subsequent example, further comprising deactivating the gas delivery system to move the seal into the first position, wherein, in the first position, the viscous material is permitted to flow over the seal into a collection device.

Example 37 is the method of any preceding example, wherein the collection device is a channel, a vacuum bar, or a sink.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A system for containing a viscous material applied to a surface of a roll, comprising:
    a seal movable between a first position and a second position, wherein the system is configured so a contacting edge of the seal contacts the surface of the roll in the first position and is separated from the surface of the roll by a gap in the second position; and
    a gas delivery system configured to move the seal between the first position and the second position and to prevent the viscous material on the surface of the roll from advancing past the seal when the seal is in the second position and separated from the surface by the gap.

2. The system of claim 1, wherein the surface of the roll carries the viscous material toward the seal.

3. The system of claim 1, wherein the roll comprises a work roll, a backup roll, or an intermediate roll.

4. The system of claim 1, further comprising a biasing mechanism, wherein the biasing mechanism maintains the seal in the first position in which the seal contacts the surface of the roll, wherein the biasing mechanism is gravity, a spring, a tensioner, or an actuator.

5. The system of claim 4, wherein the gas delivery system is configured to deliver gas toward the seal at a velocity sufficient to overcome the biasing mechanism and move the seal into the second position in which the seal is separated from the surface of the roll by the gap.

6. The system of claim 1, wherein the seal is a flexible seal or is rigid.

7. The system of claim 1, further comprising a viscous material collection device configured to collect the viscous material when the seal is in the first position.

8. The system of claim 1, wherein the gas delivery system is configured to prevent the viscous material on the surface of the roll from advancing beyond the gap past the seal when the seal is in the second position.

9. The system of claim 1, wherein the gas delivery system is configured to prevent the viscous material from advancing past the seal and toward a metal article beneath the surface of the roll when the seal is in the second position and separated from the surface by the gap.

10. A method of containing a viscous material on a surface of a roll, comprising:
    moving a seal into a first position where a contacting edge of the seal contacts the surface of the roll; and
    delivering a gas from a gas delivery system toward the contacting edge of the seal to move the seal into a second position where the contacting edge of the seal is separated from the surface of the roll by a gap,
    wherein a velocity of the gas is sufficient to prevent the viscous material on the surface of the roll from advancing past the seal when the seal is in the second position and separated from the surface of the roll by the gap.

11. The method of claim 10, further comprising containing the viscous material on a moving surface of the roll, wherein containing the viscous material on the moving surface of the roll comprises the moving surface of the roll carrying the viscous material toward the seal.

12. The method of claim 10, wherein moving the seal into the first position to contact the surface of the roll comprises moving a flexible or rigid seal into the first position to contact the surface of the roll.

13. The method of claim 10, wherein moving the seal into the first position where the contacting edge of the seal contacts the surface of the roll further comprises positioning the seal such that the seal is at an angle that is between substantially parallel to the surface and substantially perpendicular to the surface of the roll.

14. The method of claim 10, wherein moving the seal into the first position where the contacting edge of the seal contacts the surface of the roll further comprises biasing the seal with a biasing mechanism.

15. The method of claim 10, wherein delivering the gas overcomes a biasing mechanism to allow the seal to move into the second position.

16. The method of claim 10, further comprising deactivating the gas delivery system to move the seal into the first position, wherein, in the first position, the viscous material is permitted to flow over the seal into a collection device.

17. A system for containing a viscous material applied to a surface of a roll, the system comprising:
    a seal movable between a first position and a second position, wherein a contacting edge of the seal is configured to contact the surface of the roll in the first position and be separated from the surface of the roll by a gap in the second position; and
    a gas delivery system configured to move the seal between the first position and the second position and to contain the viscous material adjacent the seal when the seal is in the second position and separated from the surface of the roll by the gap,
    wherein when the seal in the second position, gas from the gas delivery system forms a contactless seal to prevent the viscous material applied to the surface of the roll from advancing past the seal toward a metal article beneath the surface of the roll.

18. The system of claim 17, further comprising a biasing mechanism, wherein the biasing mechanism maintains the seal in the first position in which the seal contacts the surface of the roll.

19. The system of claim 18, wherein the gas delivery system is configured to deliver gas toward the seal at a velocity sufficient to overcome the biasing mechanism and move the seal into the second position in which the seal is separated from the surface by the gap.

* * * * *